UNITED STATES PATENT OFFICE.

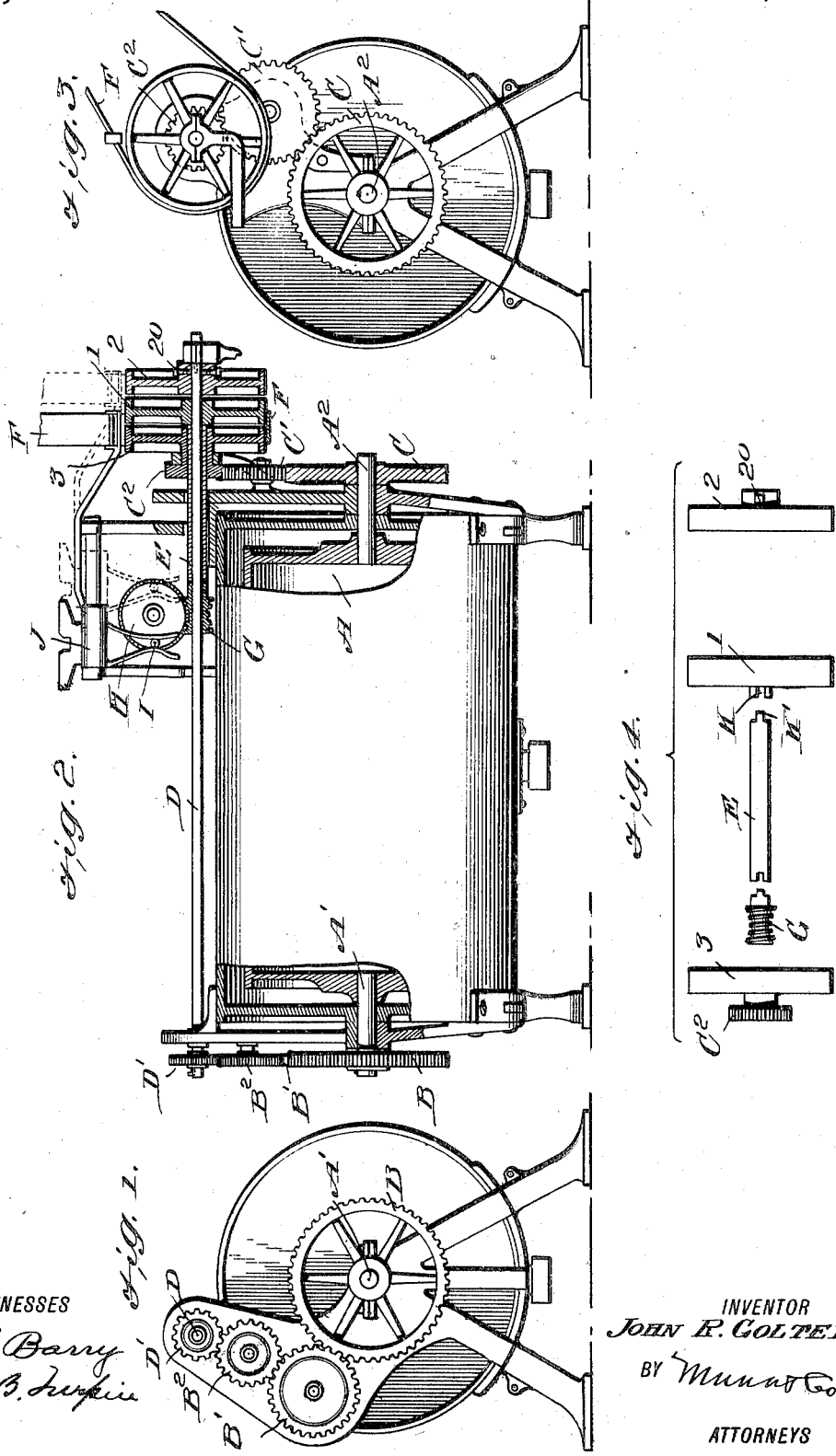

JOHN ROBERT GOLTER, OF GREENSBORO, NORTH CAROLINA, ASSIGNOR OF ONE-HALF TO JOHN M. DICK, OF GREENSBORO, NORTH CAROLINA.

REVERSING MECHANISM.

947,661.  Specification of Letters Patent.  Patented Jan. 25, 1910.

Application filed April 24, 1909. Serial No. 491,883.

*To all whom it may concern:*

Be it known that I, JOHN ROBERT GOLTER, a subject of the King of Great Britain, and a resident of Greensboro, in the county of Guilford and State of North Carolina, have made certain new and useful Improvements in Reversing Mechanism, of which the following is a specification.

This invention is an improvement in single belt reversing gear mechanism for washing machines; and consists in certain novel constructions and combinations of parts as will be hereinafter described and claimed.

In the drawing Figure 1 is an elevation of one end of the machine. Fig. 2 is a front elevation of the machine partly in section. Fig. 3 is an elevation of the end of the machine opposite that shown in Fig. 1, and Fig. 4 is a detail view showing the band pulleys, the worm, and the intermediate sleeve.

By my invention I seek to provide a novel construction of gearing for a washing machine whereby the machine may be revolved positively a given number of revolutions in one direction and then reversed and revolved a corresponding number of revolutions in the opposite direction, and in doing this I seek to drive the revolving portion of the machine in one direction from one end and in the other direction from the opposite end thus reducing the strain and lessening the tendency of the parts to become twisted in making the reversal or on reversing the direction of the revolution as sometimes occurs where the revolving parts are driven in opposite directions from the same end of the machine.

In the construction shown the revolving washer A is provided at one end with a trunnion A′, and at its other end with a trunnion A². The trunnion A′ has fixed to it a gear B and the trunnion A² has fixed to it a gear C, and these gears are meshed respectively, with gears B′ and C′ driven in the manner more fully described hereinafter.

A shaft D extends from end to end of the machine and is provided at one end with a pinion D′ geared by an intermediate gear B² with the gear B′ so the pinion D′ when turned will operate to turn the gear B and thus turn the revolving washer in one direction. At the opposite end of the shaft D from the pinion D′ I provide band pulleys 1, 2 and 3, the pulley 3 having a pinion C² meshing directly with the gear C′ and operating when turned to revolve the revolving washer in a direction the reverse of that in which it is revolved by the pinion D′. These pulleys 1, 2 and 3 all encircle the shaft D, the pulley 2, being secured on the said shaft by set screws 20, and the pulleys 3 journaling on the tube section E, which is fitted on the shaft D as shown in Fig. 2. It will be understood that means are provided for turning the pulleys 2 and 3 alternately, and in doing this I provide in connection with the pulley 1, a single belt F, which runs at all times upon the pulley 1, and upon one or the other of the pulleys 2 or 3. The pulley 1 operates upon a worm G, which meshes with a worm wheel H having a pin I operating upon the sliding shifter J to move the shifter and move the belt between its different positions. Inasmuch as the pulley 1 operates in connection with the shifting mechanism to move the belt between its different positions, I for convenience of reference, will refer to the said pulley 1 as the shifter pulley.

In connecting the shifter pulley with the worm wheel, I prefer to provide the tube E fitting on the shaft D and coupled at one end by a slip-coupling with the shifter pulley 1, and at its other end with the worm wheel G, the slip coupling being effected by notching one of the parts at K and providing the adjoining part with a tongue K′ to enter said notch as best shown in Fig. 4 of the drawing. It is preferred to make the sleeve of brass for durability, and to provide the slip couplings as shown, for special oiling purposes, this construction facilitating the feeding of oil to the shaft D by the couplings between the parts 1 and G, and the part E.

In the operation of the described construction, it will be noticed I provide the washing machine with a revolving washer and with gearing at its opposite ends for turning the revolving washer, said gearing being operated alternately to turn the revolving washer in opposite directions so that the strain of turning the washer in one direction is borne at one end of the machine and the strain of turning it in the other direction will be borne by the opposite end of the machine as will be understood from the foregoing description.

In the construction shown it will be noticed the shaft D constitutes a drive shaft for one end of the machine and also a means for supporting the several band pulleys, one of which drives the said shaft, and the other of which is mounted on the shaft and operates to drive the gearing at the opposite end of the machine from that directly driven by the drive shaft, also that the drive shaft supports the worm and the sleeve connection by which said worm is driven from the shifter pulley.

I claim—

1. In an apparatus substantially as described the combination of a revolving part having trunnions at its opposite ends, gearing in connection with said trunnions, a drive shaft, means operated by said shaft and operating upon one end trunnion to turn the revolving part in one direction, a band pulley fast upon said drive shaft, a pulley loose on the drive shaft, a sleeve connection carried by said pulley and encircling the drive shaft, and a worm encircling the drive shaft, and driven by said sleeve connection, a pulley along side the said loose pulley, means operated by said pulley and operating upon the other end trunnion of the revolving part to turn the revolving part in the opposite direction, and a belt shifter mechanism operated by the worm, substantially as set forth.

2. In a machine substantially as described the combination of a part to be driven, a drive shaft, a worm thereon, a shifter pulley on the drive shaft, a pulley on the shaft on the outer side of the shifter pulley and fast on the shaft, a connecting sleeve between the shifter pulley and the worm, a pulley on the opposite side of the shifter pulley from the shaft pulley and journaled on the connecting sleeve, gearing between the latter pulley and one end of the part to be driven, gearing between the opposite end of the part to be driven and the drive shaft, and shifter mechanism operated by the worm, substantially as set forth.

3. The combination substantially as herein described of a drive shaft, a pulley fast thereon, a shifter pulley loose on the drive shaft along side the fast pulley, a sleeve coupled at one end to the shifter pulley, and extending thence along and surrounding the drive shaft, a worm coupled to the other end of said sleeve, a pulley journaled on the sleeve along side the shifter pulley, and shifter mechanism operated by the worm, substantially as set forth.

JOHN ROBERT GOLTER.

Witnesses:
THOMAS S. BEALL,
B. L. FULLER.